United States Patent [19]

Butterfield

[11] 4,330,135
[45] May 18, 1982

[54] STUFFING BOX WITH BELLOWS TO ALLOW SHAFT GYRATORY MOVEMENTS

[75] Inventor: John P. Butterfield, Wildwood, Fla.

[73] Assignee: Jude Engineering Inc., San Francisco, Calif.

[21] Appl. No.: 207,203

[22] Filed: Nov. 14, 1980

[51] Int. Cl.³ .............................................. F16J 15/24
[52] U.S. Cl. .................................... 277/102; 277/105;
    277/112; 277/125; 277/147; 308/36.1
[58] Field of Search ........................ 277/102, 104–106,
    277/112, 113, 116.4, 123, 125, 136, 137, 147,
    174, 178, 200, 88–90; 308/36.1, 187.1, 187.2

[56] References Cited

U.S. PATENT DOCUMENTS 3,666,276  5/1972  Hubler .......................... 308/36.1 X
4,270,762  6/1981  Johnston ........................ 277/102 X

FOREIGN PATENT DOCUMENTS 965545   6/1957  Fed. Rep. of Germany ...... 277/105
1525951  5/1969  Fed. Rep. of Germany ...... 277/123

Primary Examiner—Robert S. Ward, Jr.
Attorney, Agent, or Firm—Murray and Whisenhunt

[57] ABSTRACT

A stuffing box to surround a shaft projecting from a container and comprising a casing containing an annular bellows which serves to provide for gyratory or like movements of the shaft.

4 Claims, 1 Drawing Figure

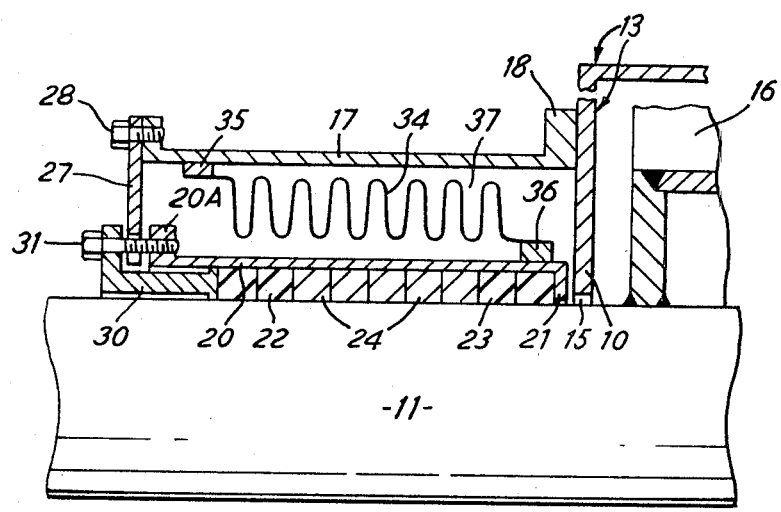

STUFFING BOX WITH BELLOWS TO ALLOW SHAFT GYRATORY MOVEMENTS

This invention relates to stuffing boxes and its object is to prevent escape of gases from a container out of which a shaft projects while at the same time permitting movements of the shaft apart from its normal rotary movements around its axis. Thus in a screw type conveyer dealing with hot materials liable to give off hot gas, the screw is located in a housing through which a driving shaft projects for driving the screw. The screw may be many feet long and can have somewhat gyratory or whipping movements and therefore some clearance must be provided between the driving shaft and the housing wall so that hot gases can escape. The present invention provides a stuffing box particularly well suited for surrounding the driving shaft to prevent escape of gas while permitting the movements of the shaft.

According to the present invention we provide a stuffing box comprising a hollow casing to surround a shaft, an end wall attached to one end of the casing, a tubular member located within the casing, bearing rings within said tubular member, and an annular bellows having one circular end fixed in a gas tight manner to the casing adjacent to the end wall and its other circular end surrounding the tubular member and fixed to it in a gas tight manner at the end remote from the end wall.

The invention will be further described by way of example with reference to the accompanying diagrammatic drawing which is a half sectional view of a stuffing box made in accordance with the invention with associated shaft and housing.

The reference 10 indicates the end wall of a housing 13 which contains a shaft 11 which carries a helical conveyer flight 16. The shaft 11 projects through the wall 10 with a clearance at 15.

The stuffing box comprises a tubular casing 17 which surrounds the shaft 11 and has a flange 18 at one end to be secured to the wall 10 in a gas tight manner. Also surrounding the shaft within the casing is a tubular member 20 having an internal flange 21 at one end which serves as an abutment for the end of a series of rings i.e. carbon bearing rings 22, 23 and asbestos type sealing rings 24. At the other end of the casing there is an end wall 27 attached to it by bolts 28. This end wall 27 also locates a tubular member 30 which engages the other end of the rings and is adjustable axially of the shaft by screws 31 so as to hold the series of rings against the abutment flange 21.

A metal bellows 34 has one circular end fixed in gas tight manner to the casing at 35 adjacent to the end wall and has its other circular end fixed in gas tight manner at 36 to the tubular member 20 thus providing a sealed space 37 to contain any gas which may escape from the clearance 15.

The driving shaft may contain various pipes or channels for supply of material to be treated to the housing, and water or other cooling or heating material.

The screws 31 pass through a flange 30A on the end of the member 30, through the wall 27 with adequate clearance so as to hold the member 30 against rotation while permitting tilting movements of the shaft with the parts carried by it, and engages in a flange 20A on the end of the member 20.

I claim:

1. A stuffing box comprising a hollow casing to surround a shaft, an end wall attached to one end of the casing, a tubular member located within the casing, bearing rings within said tubular member, and an annular bellows having one circular end fixing in a gas tight manner to the casing adjacent to the end wall and its other circular end surrounding the tubular member and fixed to it in a gas tight manner at the end remote from the end wall.

2. A stuffing box as claimed in claim 1 wherein said adjusting means engages in the end wall with clearance to restrain the tubular member from rotation while permitting it to float sufficiently to allow for movements of the shaft.

3. A stuffing box as claimed in claim 1 having adjusting means for adjusting the tubular member and bearing rings axially, said adjusting means passing through said end wall with clearance which permits tilting movements of the annular member and bearing rings but prevents rotation of the annular member.

4. A stuffing box as claimed in claim 3 wherein the adjusting means comprises an annular member having one end within the casing in engagement with the bearing rings and a flange on its other end outside the casing and screws passing through the flange and passing through the end wall with said clearance and engaging in a flange on the end of said tubular member.

* * * * *